Feb. 7, 1956  H. W. TREVASKIS  2,733,941
FLEXIBLE HOSE COUPLINGS
Filed Dec. 8, 1951
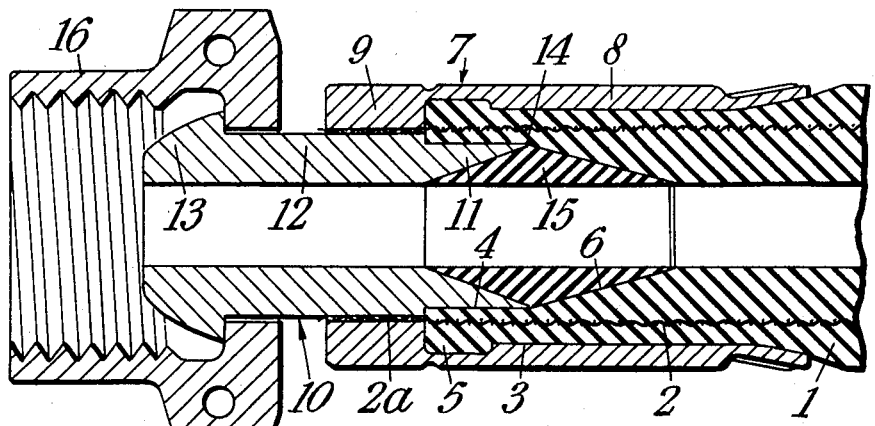
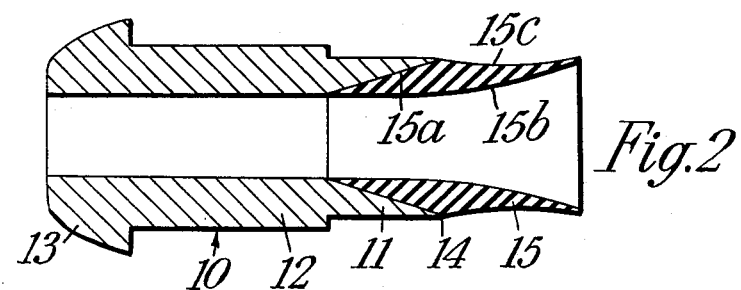
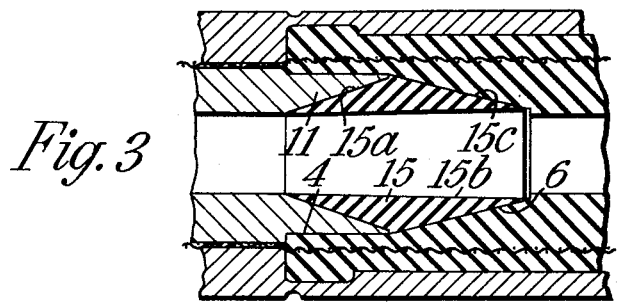
INVENTOR
Henry William Trevaskis
by Benj. T. Rauba
his attorney

United States Patent Office 2,733,941
Patented Feb. 7, 1956

2,733,941

FLEXIBLE HOSE COUPLINGS

Henry William Trevaskis, Solihull, England, assignor to Dunlop Rubber Company Limited, London County, England, a British company Application December 8, 1951, Serial No. 260,749

4 Claims. (Cl. 285—84)

This invention relates to couplings for flexible hose pipes and more particularly to couplings for reinforced high pressure hose pipes.

End couplings for flexible hose pipes are known comprising a tubular insert fitted in the bore of the hose and a sleeve fitted to the outer periphery of the hose, the sleeve being inwardly swaged to grip the hose between the sleeve and insert. The insert is usually provided at one end with a part-spherical nipple and a coupling nut is provided to enable the nipple to be held against a complementary seating. High pressure hose is normally reinforced by one or more layers of wire or fabric reinforcement, and in some types of coupling the reinforcement is bared at one end of the hose and is gripped between two parts of the coupling. Such a hose coupling has been described and claimed in British Patent No. 511,552, August 21, 1939.

Couplings such as the above may tend to leak at very high pressures, and in the type of coupling described and claimed in British Patent No. 581,180, October 3, 1946, the end of the hose is circumferentially slit and the insert is provided with an annular tapered portion which fits into said slit, thus forcing an annular layer of rubber inwardly into the bore of the hose. A sealing zone is thus formed between the layer of rubber and the tapered portion of the insert and this effectively prevents leakage of liquid, even at very high pressures. In order to prevent any tendency of the liquid, on reversal of flow, to prise the layer of rubber away from the insert a thin metal tube is fitted in the bore of the insert and projects into the hose to a location substantially in line with the end of the split portion.

In this type of high pressure hose coupling the bore of the hose is partially obstructed by the annular layer of rubber and by the metal tube. This restricts the flow of liquid through the hose, which is undesirable where the full bore flow is required.

The object of the invention is to provide an end coupling for high pressure hose having a leak-proof sealing zone wherein the bore of the hose is not obstructed by parts of the hose or coupling.

According to the invention a coupling for flexible hose comprises an insert and a sleeve adapted to grip the end of a hose inserted between them and an annular resilient tapered fillet secured to the end of the insert in a fluid-tight manner.

According to the invention also a hose coupling assembly comprises a hose having an internally recessed portion at an end thereof, the inner end of said recess being tapered, an insert fitted within said recessed portion, a sleeve fitting around the outer periphery of the hose and clamping the hose between the sleeve and insert and an annular resilient fillet fluid-tightly secured to the end of the insert and having a tapered portion forming a sealing zone with the tapered portion of said recess.

Preferably the end of the insert is tapered to a knife-edge and one side of the fillet is bonded to said tapered portion. The fillet may alternatively be secured to the insert by means of a suitable adhesive. Where high pressure reinforced hose is employed the reinforcement is preferably clamped between two parts of the hose coupling.

A hose coupling in accordance with the invention preferably comprises a sleeve adapted to be swaged on to the outer periphery of one end of a flexible hose and a tubular insert adapted to be fitted within the bore of the hose. The end of the insert to be fitted within the hose is tapered to a knife edge, said knife-edged portion being at the outer periphery of the insert. An annular rubber fillet having a wall of substantially triangular section is provided, and one side of the fillet is secured in fluid-tight manner to the tapered end of the insert. The outer side of the fillet is of substantially uniform diameter and is adapted to bear against the inner periphery of the hose and form a sealing zone therewith.

In order that the invention may be more fully described, reference is made to the accompanying drawings, of which Fig. 1 is a sectional view of a hose coupling constructed in accordance with the present invention.

Fig. 2 is a sectional view of an insert and associated resilient fillet before assembly.

Fig. 3 is a longitudinal section similar to that of Fig. 1 of part of another embodiment of the invention.

In one embodiment of the invention (Fig. 1), an end coupling is provided for a high-pressure flexible rubber hose 1 having a tubular woven metal wire reinforcement 2 embedded in the rubber. The rubber at that end of the hose to which it is desired to apply the coupling is ground away to expose a short length of the wire reinforcement 2a. The outer periphery of the hose is partly ground away for a short distance from its end to provide a recessed portion 3 of reduced diameter and the inner periphery of the hose is likewise partly ground away to provide a recessed portion 4 of increased diameter. The annular tongue of rubber 5 left between said recessed portions is approximately one half of the original thickness of the wall of the hose. The end of the inner recessed portion is chamfered at 6 to meet the original inside diameter of the hose, the angle of taper being substantially 30° to the axis of the hose.

A sleeve 7 is fitted to the outer periphery of the hose, said sleeve comprising a portion 8 adapted to fit in the outer recessed portion of the hose, said sleeve portion being provided with inwardly extending annular corrugations (not illustrated), and a portion of reduced diameter 9 at one end thereof adapted to fit against the outer periphery of the bared wire reinforcement 2a.

A tubular insert 10 (Figs. 1 and 2) is provided comprising a smaller diameter part 11 adapted to fit the inner recessed portion of the hose, a larger diameter part 12 adapted to fit against the inner periphery of the bared wire reinforcement and a part-spherical nipple 13 projecting exterior of the hose. The smaller diameter part of the insert is provided with outwardly extending annular corrugations (not illustrated), and the internal diameter of said insert is equal to the internal diameter of the hose.

The end of the smaller diameter part 11 of the insert remote from the nipple is tapered to a knife edge at 14, the knife edge portion being at the outer periphery of said nipple part, and the angle of taper being of the order of 30° to the axis of the insert. An annular rubber fillet 15 (Fig. 2) having a wall of substantially triangular section is provided having one side, 15a bonded to the tapered end of the insert. The inner peripheral side 15b of the fillet before it is fitted to the hose, curves outwardly, increasing in diameter from the bonded end to the free end, and the outer side 15c has substantially the same diameter as the external diameter of the smaller diameter part 11 of the insert, the axial length of said side being substantially the same as the length of the tapered end 6 of the recessed portion at the inner periphery of the hose.

The insert 10 is fitted within the recessed portion 4 at the inner periphery of the hose, the nipple end 13 projecting therefrom and the wire reinforcement 2a lying between the reduced diameter portion 9 of the sleeve and the larger diameter portion 12 of the insert. The smaller diameter part of the insert 11 fits within the said recessed portion, the annular corrugations biting into the rubber of the hose. In this position of the insert the rubber fillet 15 is deformed as shown in Fig. 1 to substantially fill the annular recess of triangular section between the end of the insert and the end of the associated recess. The side 15c of the fillet which was originally of substantially the same diameter as the smaller diameter part 11 of the insert is now deformed inwardly to form a sealing zone against the tapered end 6 of the associated recessed portion. The previously curved inner peripheral side 15b of the fillet is now substantially straight and concentric with the insert.

The sleeve is inwardly swaged to clamp the reinforcing wire securely between the associated parts of the sleeve and insert, the rubber part of the hose likewise being gripped between the corrugations on the sleeve and insert.

A coupling nut 16 is fitted to the larger diameter part of the insert, between the end of the sleeve and the nipple. The nut may be swaged in position after the insert and sleeve have been fitted to the hose.

A leak-proof hose coupling is thus provided wherein the bore of the hose is not obstructed by a part of the hose or the coupling, and this permits an unrestricted flow of pressure liquid through the coupling. The hose may be made of rubber or a synthetic rubber-like material and may be provided with either a wire or a fabric reinforcement. The fillet may be made of rubber or a synthetic rubber-like material and may be bonded to the insert or secured thereto by a suitable adhesive.

In another embodiment of the invention (Fig. 3), the length of the side 15c of the resilient fillet is made slightly shorter than the tapered wall 6 of the recess 4 against which it seats to form a sealing zone. Thus when the insert is fitted to the hose the end of the side 15b of the fillet remote from the insert is stepped back slightly from the bore of the hose. This ensures that, on reversal of flow of liquid in the coupling, said liquid will not tend to prise the fillet away from the tapered end of the recess and thus allow pressure liquid to leak through the sealing zone.

Having described my invention—what I claim is:

1. An end connection for flexible hose comprising a hose having a recess at the inner periphery at one end, said recess comprising a cylindrical surface extending inwardly from said end and then tapering in a gradual slope to the inner surface of the hose, a non resilient insert fitted within said recess, said insert having a cylindrical outer surface closely fitting the cylindrical surface of said recess, the inner surface of said insert being tapered to a thin edge at the end of said insert so that when said insert is inserted into said recess it forms with the tapered surface of said recess a circular groove of triangular section having a gradual slope for each side, a sleeve fitting around the outer periphery of the hose and clamping the hose between the sleeve and the insert and an annular resilient fillet of triangular section fitted within the groove, the inner surface of the fillet being of the same diameter as the bore of the hose and being in alignment with said bore, one side of the tapered end of the fillet fitting the taper of the insert fluid tightly and the other tapered side of the fillet fitting the tapered part of the hose fluid tightly to form a fluid tight joint, wherein the annular fillet is preformed to resiliently grip the tapered end of the recess in the hose and is bonded to the insert.

2. An end connection for flexible hose having a reinforcement embedded therein having a recessed portion at the inner periphery thereof, said recessed portion being recessed to said reinforcement at its outer margin then stepped to a smaller diameter and the end of said recess being tapered, a non-flexible insert fitted within said recessed portion, said insert having a stepped end portion to fit said reinforcement and said stepped portion of said recess and having a tapered end to define a groove triangular in cross-section between said end of said insert and the tapered end of the recess in the hose, a sleeve fitting around the outer periphery of the hose and clamping the hose between the sleeve and insert and an annular resilient fillet of substantially triangular section fitted within said groove and having one side substantially concentric with the inner diameter of the hose, one side of said fillet being secured to the tapered end of said insert and the third side abutting the tapered end of the recess of the hose and forming a fluid-tight sealing zone therewith.

3. The end connection of claim 2 in which the outer periphery of said hose is reduced in diameter at the portion covered by said sleeve.

4. An end connection for flexible hose comprising a hose having a recess at the inner periphery at one end, said recess comprising a cylindrical surface extending inwardly from said end and then tapering in a gradual slope to the inner surface of the hose, a non resilient insert fitted within said recess, said insert having a cylindrical outer surface closely fitting the cylindrical surface of said recess, the inner surface of said insert being tapered to a thin edge at the end of said insert so that when said insert is inserted into said recess it forms with the tapered surface of said recess a circular groove of triangular section having a gradual slope for each side, a sleeve fitting around the outer periphery of the hose and clamping the hose between the sleeve and the insert and an annular resilient fillet of triangular section fitted within the groove, the inner surface of the fillet being of the same diameter as the bore of the hose and being in alignment with said bore, one side of the tapered end of the fillet fitting the taper of the insert fluid tightly and the other tapered side of the fillet fitting the tapered part of the hose fluid tightly to form a fluid tight joint, wherein the tapered end of said fillet inserted in the tapered end of the recess in said hose is flared outwardly when out of said recess and unstressed and is compressed to form a tight seal when inserted into said recess and wherein the fillet is bonded to said insert.

References Cited in the file of this patent

UNITED STATES PATENTS

| | | |
|---|---|---|
| 1,035,063 | Werner | Aug. 6, 1912 |
| 2,394,632 | Parker | Feb. 12, 1946 |
| 2,416,657 | Trevaskis | Feb. 25, 1947 |
| 2,473,441 | Muller | June 14, 1949 |